United States Patent [19]

Clayton et al.

[11] Patent Number: 5,221,966
[45] Date of Patent: Jun. 22, 1993

[54] VIDEO SIGNAL PRODUCTION FROM CINEFILM ORIGINATED MATERIAL

[75] Inventors: John C. Clayton; David C. Kneller, both of Buckinghamshire, England

[73] Assignee: Avesco Plc, Chessington, England

[21] Appl. No.: 642,206

[22] Filed: Jan. 16, 1991

[30] Foreign Application Priority Data

Jan. 17, 1990 [GB] United Kingdom ............... 9001079
Mar. 13, 1990 [GB] United Kingdom ............... 9005645

[51] Int. Cl.[5] ...................... H04N 7/01; H04N 11/20
[52] U.S. Cl. ..................................... 358/140; 358/11
[58] Field of Search ................... 358/11, 12, 100, 141

[56] References Cited

U.S. PATENT DOCUMENTS

| 3,882,539 | 5/1975 | Faroudja | 358/140 |
| 4,275,422 | 6/1981 | Le Couteur | 358/140 |
| 4,766,484 | 8/1988 | Clayton et al. | 358/23 |
| 4,876,596 | 10/1989 | Faroudjar | 358/11 |
| 4,935,816 | 6/1990 | Faber | 358/140 |
| 4,998,167 | 5/1991 | Jaqua | 358/140 |

FOREIGN PATENT DOCUMENTS

| 0162486 | 11/1985 | European Pat. Off. |
| 0233720 | 8/1987 | European Pat. Off. |
| 0241284 | 10/1987 | European Pat. Off. |
| 2007935 | 5/1979 | United Kingdom |
| 1592486 | 7/1981 | United Kingdom |

Primary Examiner—John K. Peng
Attorney, Agent, or Firm—Olson & Hierl, Ltd.

[57] ABSTRACT

A system for converting an input television signal that contains field sequences corresponding to frames in cine film is provided. The input signal is converted into an intermediate television signal wherein there is a direct correlation between the field groups thereof and the original film frames. The intermediate signal is modified to produce and output television signal whose field rate is that of a desired television signal. For example, the input signal can be an NTSC signal produced in part from a 3:2 pull down technique, the intermediate signal may be characterized by 625 lines and 48 fields per second or characterized by 525 lines and 625 fields per second, and the output signal can be a PAL signal characterized by 625 lines and 50 fields per second. In each case, a 3:2 sequence of input signal fields (correlated with cine frames) results in pairs of fields in the output signal correlated with the cine frames. A television signal standards converter and a frame detector for use in the system are provided.

17 Claims, 9 Drawing Sheets

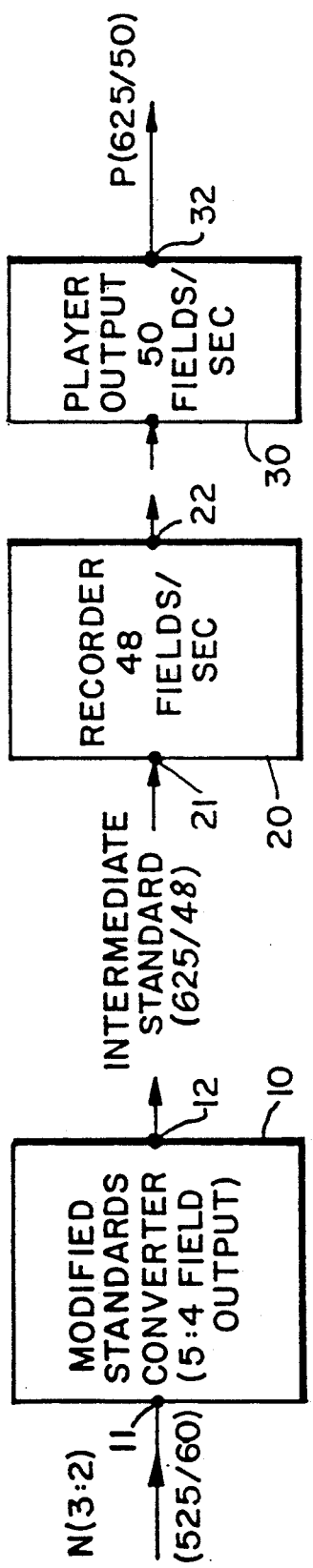
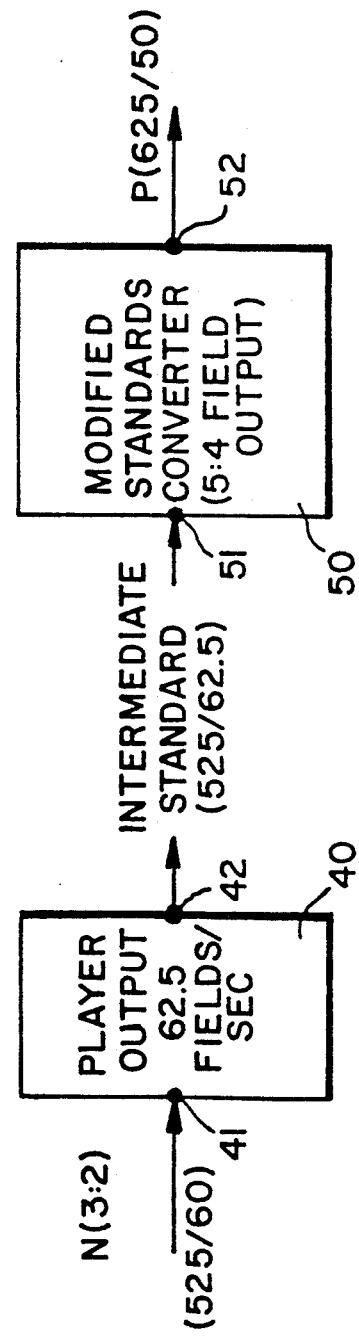

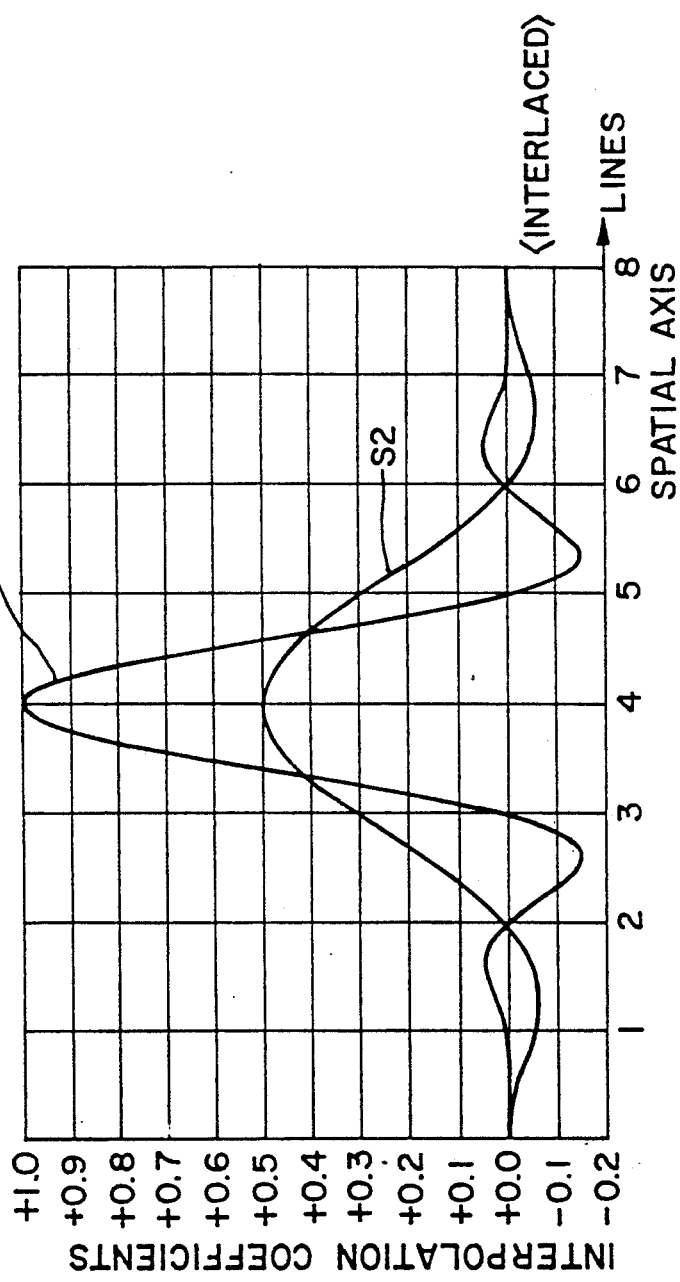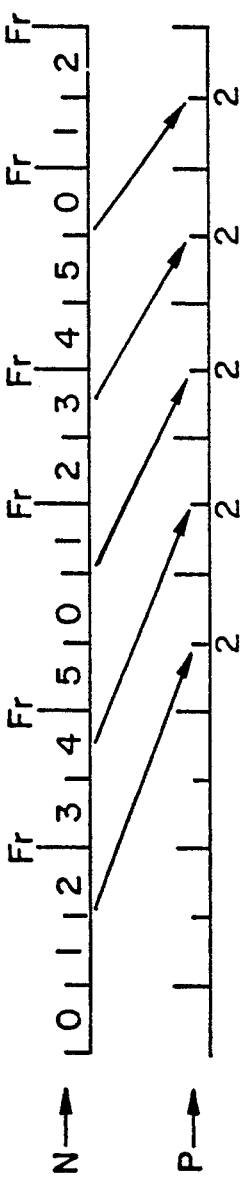

VIDEO SIGNAL PRODUCTION FROM CINEFILM ORIGINATED MATERIAL

FIELD OF THE INVENTION

This invention relates to video signal production from cinefilm originated material signals and more especially but not exclusively PAL signals converted from NTSC signals derived from cinefilm.

BACKGROUND OF THE INVENTION

The problems which arise are due to the frame/field rate differing between cine, NTSC and PAL video signals. These are NTSC 525 lines/60 fields with a frame rate of 30 per second, PAL 625 lines/50 fields with a frame rate of 25 per second and cinefilm having a film frame rate of 24 per second.

When cinefilm is taken as the source, that is the direct source for conversion to PAL video signals, there are two known techniques.

The first conversion technique involves direct conversion from cinefilm to PAL video signals. This technique uses a tele-cine machine to run the cinefilm at an increased speed, in fact at an increased rate which is 4% faster such that the PAL video signal has a 25 frame per second rate of cinefilm. This direct conversion works very well when the original source cinefilm is available.

The second technique which is employed for such conversion involves the intermediate step of converting the cinefilm to an NTSC video signal and then converting that video signal to a PAL video signal. This technique involves a conversion from cinefilm to NTSC video signal which uses what is defined as the 3:2 pull down technique. The technique treats the first and second frames of a pair in the following manner. The first frame is repeated to provide three television fields, and the second frame is repeated to provide two television fields, thus the NTSC video signal comprises 60 television fields per second or a frame rate of 30 television fields per second as compared with the original cinefilm frame rate of 24 frames per second.

The present invention addresses the deterioration in viewing quality of PAL transmission of pictures converted by the second of these techniques, particularly in the case where the editing of the film has been affected by NTSC video editing techniques.

The resulting product is considerably inferior by comparison with the product produced by direct telecine conversion from cinefilm to PAL video signals.

The reasons for the deterioration in quality are:
1. the conversion process introduces unavoidable degradations
2. the conversion process involves temporal interpolation which means that the PAL video output signal (625 lines/50 fields) consists, in general, of a mix of neighbouring NTSC video signal input fields (525 lines/60 fields), these neighbouring fields sometimes containing information derived from the same cine-frame and sometimes derived from two sequential cine-frames. This leads to the blurring of moving images when the final product is viewed on a receiver.
3. the overall process of temporal interpolation is attempting to produce a PAL format with 25 output frames per second from a source (originally cinefilm) which was transferred to NTSC format by the 3:2 pull down technique at 24 frames per second. Despite the use of temporal interpolation, the difference frequency is visible as a judder effect occurring at the different frequency of 1 Hz during camera panning over a suitable interval.
4. the original conversion from cinefilm to NTSC format introduces a 12 Hz judder characteristic which is embedded in the NTSC video signal (525 lines/60 fields). Whilst this 12 Hz judder characteristic is acceptable for NTSC transmission, this characteristic, when it is subsequently converted to PAL video signals, further detracts from the quality of the converted PAL transmission.

SUMMARY OF THE INVENTION

The present invention seeks to provide a PAL signal derived from an NTSC edited film source (i.e. derived by a 3:2 pull down technique) of a final product quality comparable with a PAL signal derived directly from cinefilm by tele-cine techniques.

In a preferred embodiment, the present invention further seeks to provide a method of, and an apparatus for, producing a PAL video signal derived from an NTSC edited film source wherein that source itself has been subject to television film editing techniques such as the combination of video signals from two or more separate video signal sources (e.g. the merging of two video film sources) and which therefore may exhibit sequences during which the 3:2 frame relationship no longer pertains.

Accordingly, the present invention provides a conversion process which produces a PAL video signal having two fields for each original cine-frame, this being achieved by the use of an intermediate standard in the conversion process between the NTSC video signal source and the final video signal product.

In one embodiment the intermediate standard video signal is a PAL video signal with a 625 line/48 field per second characteristic. This video signal has the same frame rate as that of the cinefilm used to make the original NTSC 3:2 pull down video signal by film to video transfer. It should be noted that in practice the frame rate is 23.976 frames per second (for the intermediate standard) due to the NTSC original video signals (on the 525/60 standard) having the exact field frequency of 59.94 Hz.

This standard may be produced in a slowed-down PAL format, wherein the sub-carrier frequency is reduced in the same proportion as all other frequencies to approximately 4.252 MHz. This video signal would be derived by conversion in a modified standards converter wherein the PAL characteristics have been modified so that the frequencies are appropriately reduced in accordance with a sub-carrier frequency of 4.252 MHz. Such a modified PAL video signal may then be recorded onto video tape in a modified PAL recorder capable of recording at this reduced rate. The video tape thereby produced is indistinguishable from a standard PAL recording. The replay of this recording on an unmodified PAL player then produces a standard PAL video signal (625 lines/50 frames per second) which then displays the original sequence of cine frames (24 frames/sec) at 25 frames/sec and two fields/cine-frame. This is the same mode of display as a direct tele-cine transfer from cinefilm to PAL video signal.

A second alternative intermediate television standard may be produced by running the NTSC video source (525/60) on video tape at an increased rate which is 4% faster than normal so as to provide an intermediate standard video signal for input to standards conversion equipment.

In order to be able to output such an intermediate standard signal it will be necessary to provide suitably modified video playing equipment capable of the higher playing rate. It will also be necessary to adapt a standards converter to receive such a signal and to produce a normal PAL video output signal (625 lines/50 fields per second).

The use in the conversion process of either of the above intermediate standards, will result in a reduction of the programme length by 4% due to the total number of frames in the PAL output signal being equal to the total number of cine-frames originally recorded in the cinefilm at 24 frames per second.

Applicants having developed their invention in order initially to handle the transfer of cine film originated material from NTSC television standard to PAL television standard as outlined above, then considered the wide application of their developments and appreciated its generality in terms of converting material originated on cine film between television standards in general.

According to one aspect of the present invention there is provided a method of conversion of an input television signal of a given television standard itself containing at least in part original field sequences corresponding to cine frames based on original cine film source material at a slower frame rate than the frame rate of said television signal material being converted, comprising the steps of:

(a) standards converting said input television signal containing at least in part said original field sequences corresponding to cine frames to an intermediate standard television signal in which there is a direct correlation between field groups of the intermediate standard television signal and individual cine frames in said original field sequences, and, (b) modifying the field rate of the intermediate standard television signal to the field rate of the desired standard television output signal.

In the specific case of converting NTSC, including at least in part NTSC (3:2) material, the given television standards signal is an NTSC television signal originally produced at least in part from cine film by a 3:2 pull down technique whereby pairs of the original cine frames are repeated as sets of 3 and 2 fields in the NTSC signal, and wherein the output signal is to be a PAL television signal having a pair of television signal fields for each cine frame in said original field sequences.

In this particular embodiment then in step (a) the NTSC television signal is converted to an intermediate standard with the characteristic of 625 lines and forty eight fields per second whereby each frame represented by a field group in the 3:2 field sequence in the NTSC television signal is represented by two fields in the converted signal thereby establishing a one to one correlation between the frames of the 24 frame per second cine film and pairs of fields in the converted television signal.

In addition the step (b) may comprise modifying the transmission rate of the converted (i.e., intermediate) signal to an accelerated transmission rate of 50 fields per second thereby to produce a standard PAL output signal.

In an embodiment the step of accelerating comprises recording the intermediate standard television signal at the field rate of 48 fields per second using a modified recorder and then playing said recording on a standard PAL player having an output signal with a field rate of 50 fields per second to obtain a PAL television signal.

In another embodiment the step of accelerating may comprise inputting the intermediate standard television signal at a field rate of 48 fields per second to a buffer store from which the television signal is then output at the standard PAL television signal rate of 50 fields per second.

According to another aspect of the invention there is provided a method of conversion of an input television signal of a given television standard itself containing at least in part original field sequences corresponding to cine frames based on original cine film source material at a slower frame rate than the frame rate of said television material being converted, comprising the steps of:

(a) modifying the field rate of said input television signal to obtain an intermediate standard television signal containing said original field sequences corresponding to cine frames, and, (b) standards converting this intermediate standard television signal into an output television signal at the desired television standard in which there is a direct correlation between field groups of said output television signal and individual cine frames in said original field sequences.

Again in the specific case of converting NTSC, including at least in part NTSC (3:2) material, the given television standards signal is an NTSC television signal originally produced at least in part from cine film by a 3:2 pull down technique whereby pairs of the original cine frames are repeated as sets of 3 and 2 fields in the NTSC signal, and wherein the output signal is to be a PAL television signal having a pair of television signal fields for each cine frame in said original field sequences.

Preferably in step (a) the NTSC signal with a field rate of 60 fields per second is processed to produce an intermediate standard signal with a modified field rate of 62.5 fields per second.

In an embodiment this step (a) of modifying the field rate comprises playing a recording of the NTSC signal on a modified video player to obtain an output signal of said intermediate standard having an accelerated field rate of 62.5 fields per second. Again a buffer store could be employed.

In the preferred embodiment step (b) comprises conversion from said intermediate standard of 525 lines and 62.5 fields per second to a PAL signal of 625 lines and 50 fields per second such that from each 3:2 field sequence in the intermediate standard television signal the PAL output signal has a pair of fields representing each frame of the original cine film, each frame being derived from respective ones of the three and two field groups.

The aforegoing methods would be applicable to the standards conversion of material e.g. from NTSC television signals to PAL television signals which is wholly derived from cine film originated material. In the case of NTSC (3:2) conversion all the original field sequences would be in the 3:2 format where each group of three fields and each group of two fields represents a discrete cine frame of the cine film.

It will be apparent to those skilled in the art that the possibility exists to take PAL television signals originated from cine film and to use modified standards conversion to obtain an NTSC 3:2 television signal, with appropriate field rate modification as as to maintain a direct correlation between the cine frames originating at 24 frames per minute and the NTSC field rate of 60 fields per minute, whereby the effect transmitted is directly equivalent of direct conversion from cine film to NTSC (3:2) by the conventional 3:2 pull-down technique.

As previously mentioned, there is the question of converting television signals which, due to editing or other post-production techniques, are not made up solely of original field sequences to cine frames based on original cine film source material.

According to yet another aspect of the present invention there is provided a method of television standards conversion from one television standard to another of material derived at least in part from cine film originated material, comprising the steps of:

(a) distinguishing between parts of the material which have originated from cine film material at conventional cine frame rate and remaining television signal which does not conform to that characteristic, (b) converting the cine film originated material in accordance with a cine interpolation technique characterised by an output signal maintaining a direct correlation between single cine frames and groups of television signal fields, and, (c) converting the remaining television signal in accordance with a video interpolation technique characterised by a spatial and temporal aperture.

This method allows a television signal which does not comprise exclusively cine film originated material to be processed according to whether the material requires cine interpolation for identifiable film originated sequences for which greater resolution can be employed in the spatial interpolation, or according to whether the material requires video interpolation because there are no original cine film sequences therein.

In that context there is further provided a television standards converter comprising an interpolation processing unit operable to convert television signal in accordance with a video interpolation technique characterised by a spatial and temporal aperture and also operable to convert television signal derived from cine film originated material in accordance with a cine interpolation technique characterised by the feature of maintaining a direct correlation between groups of television signal fields in the output signal and individual cine frames in the cine film originated material.

In order to facilitate distinguishing between the different parts of the material (as aforesaid), there is still further provided a frame detector for use with a television standards converter in the conversion of television signals comprising at least in part material derived from cine film originated material, the detector comprising means for sampling pixel values on an area by area basis for discrete areas over a field of an incoming television signal, means for summing those pixel values for each given area, means for deriving on an area by area basis, the difference between the area value for the field under review and the preceeding field and providing the modulus of said difference, means for summing the moduli of said area difference values over the field under review and obtaining a field difference sum, means comparing the field difference sums over a group of fields so as to identify frame boundaries in a sequence of said field difference sums, whereby the identification of a regular sequence of frame boundaries in an output signal thereof is indicative of television signal originated from the cine film material.

BRIEF DESCRIPTION OF DRAWINGS

In the drawings:

FIG. 1 shows schematically one apparatus for converting NTSC (3:2 field) signal to PAL signal;

FIG. 2 shows schematically another apparatus for converting NTSC (3:2 field) signal to PAL signal;

FIG. 10 illustrates a pair of spatial interpolation apertures (S1, S2 for cine interpolation and video interpolation, respectively; and FIG. 11 illustrates the correlation between successive frames of originating cine film in an NTSC (3:2 field) signal being processed and field pairs in a PAL output signal.

DETAILED DESCRIPTION

Figure 3:
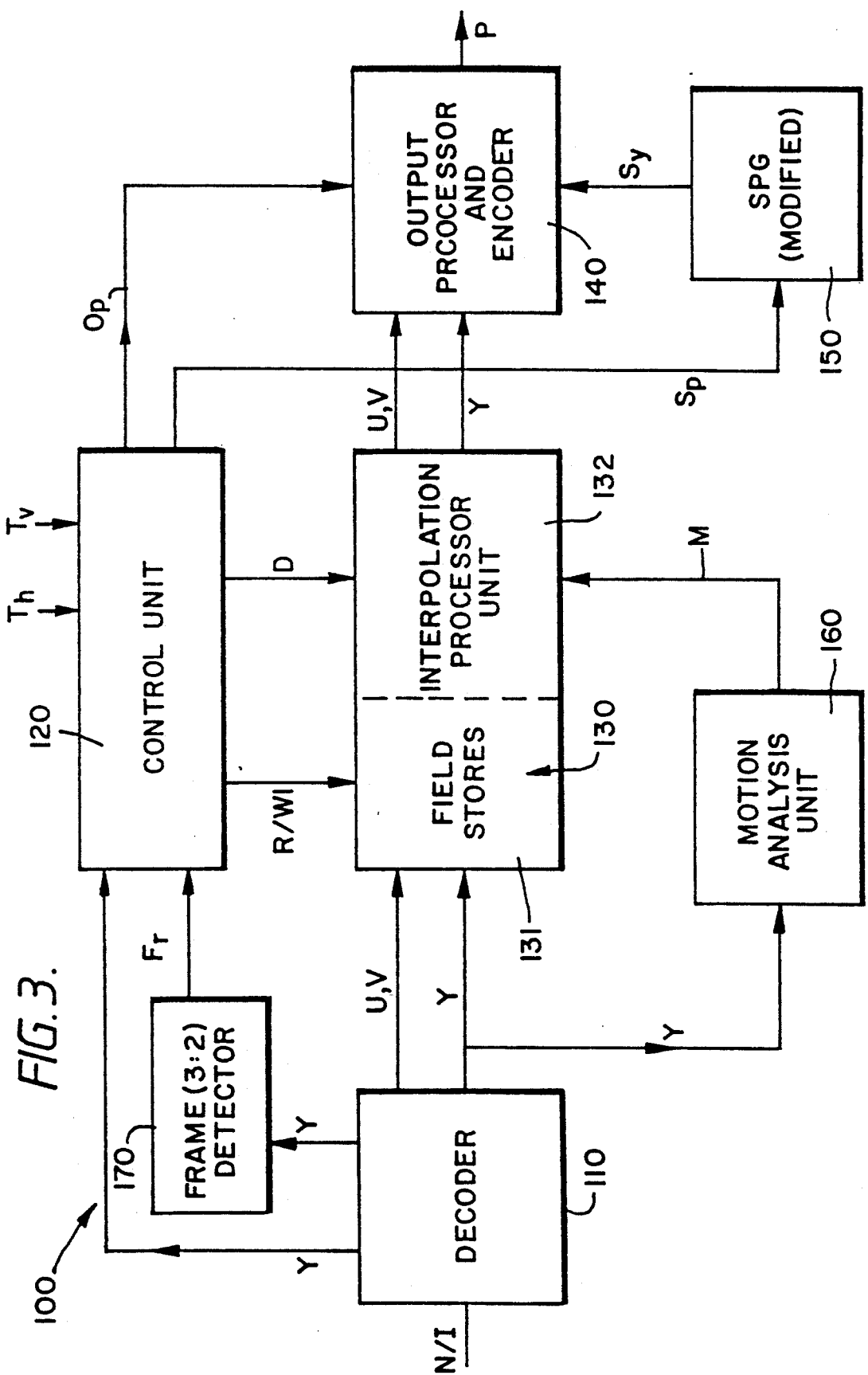
FIG. 3 shows schematically a standards converter for use in the apparatus of FIGS. 1 and 2.

In FIG. 1 there is a schematic of apparatus for converting an NTSC television video signal derived from cine film by the 3:2 pull down technique to PAL television signals. The first unit in the drawing is a modified standards converter referenced 10 which is capable of receiving the NTSC signal (525 lines/60 fields per second) at its input 11 and converting this to an intermediate standard signal at its output 12. The intermediate standard signal has the characteristic of 625 lines and 48 fields per second. In the preferred case, this output signal is a modified PAL video signal with a sub-carrier frequency of approximately 4.252 MHz. This intermediate standard signal is then input at 21 to a modified recorder 20 which records at a field rate of 48 fields per second. The recorder makes the recording on video tape notionally indicated as the output 22. The recording is made at a field rate of 48 fields per second corresponding to the field rate of the intermediate standard. This video recording is then input at 31 to a normal video player 30 which plays the recording at the normal rate, thus giving a standard PAL output signal P at output 32. The output signal P has the standard PAL characteristics of 625 lines and 50 fields per second. Thus by this method the input signal N (3:2) which is an NTSC signal containing 3:2 sequences, representing three fields and two fields corresponding to individual frames of a frame pair in the cine film has been converted to PAL sequences in which field pairs correspond to frames in the cine film. This gives a direct one to one correlation between the PAL signal field pairs and the frames of the original cine film sequence. In the standards converter 10 there are two characteristics of the form of interpolation which differ from hitherto known interpolation techniques. The first is that the converter 10 identifies the 3:2 sequences and from a group comprising five fields will output two fields from the group of three and two fields from the group of two thus outputting four fields which correspond to two frames of the original cine film. Secondly this is achieved using a "cine" interpolation aperture (to be further described).

An alternative method and apparatus is illustrated schematically in FIG. 2 in which the conversion of an NTSC signal to a PAL signal is illustrated in a manner analagous to that of FIG. 1. In this case, the input signal N (3:2), which is an NTSC signal (derived by a 3:2 pull down technique) having the characteristic 525 lines and 60 fields per second, is input at 41 to a modified video player 40. The video player 40 is so modified that its output at 42 is at an increased field rate of 62.5 fields per second. This creates a new intermediate standard signal having the characteristic 525 lines and 62.5 fields per second which is input at 51 to a modified standards converter 50. The modified standards converter 50, like the converter 10 of FIG. 1, operates to make 4 from 5 field selection and also operates to carry out "cine" interpolation (to be further described). The output of this standards converter at 52 is thus a PAL signal with the normal characteristics 625 lines/50 fields per second. Again, because of the four from five field selection there is a direct correlation between pairs of fields of the PAL signal and the frames of the original cine film. Synchronisation has to be accomplished in order that in the 3:2 sequences, two fields are taken from the three field group and two fields are taken from the two field group. With this technique, the direct correlation between the field pairs of the PAL output signal and the original cine film is maintained and thus the results are the equivalent of those obtained by direct tele-cine techniques.

The method and apparatus of FIGS. 1 and 2 have in common that the use of recorder 20 and player 30 in FIG. 1 increases the field rate by 4% and the player 40 of FIG. 2 also increases the field rate by 4%. This means that the final product when viewed on a PAL television receiver has a reduced programme time of 4%. In addition, both embodiments have in common the characteristic that the standards converter operates "cine" interpolation with a four from five field selection and the avoidance of temporal interpolation between frames of the original cine film for the processing of NTSC signal produced by the 3:2 pull down technique hereinafter referred to as NTSC (3:2) or cine NTSC.

A modified standards converter is shown in FIG. 3 in which the basic circuitry is derived from known digital standards converters such as those sold by the applicants under their trademarks ADAC and ISIS. Such standards converters are for general use in converting between television standards such as NTSC and PAL. The standards converter comprises a decoder 110 which receives the analogue input signal identified as N/I and generates digitised luminance signal Y and chrominance signals U,V. One input signal N would be a standard NTSC signal for processing in the conventional way to a PAL output signal P from the output processor and encoder 140. This is accomplished under the control of a control unit 120 which controls the operation of field stores 131 and an interpolation processor 132 in a unit 130. The control unit 120 receives horizontal and vertical synchronising signals extracted from the input signals Th,Tv and from these signals it keeps track of the position of the current signal at the decoder relative to an interpolation aperture (which will be further described). For interpolation in terms of both spatial and temporal interpolation, for example using an aperture covering four fields and four lines, the control unit 120 outputs signals to achieve this interpolation. Thus a signal R/W1 is output to the field stores 131 to control the writing of chrominance values U,V and luminance values Y to the field stores. In addition in accordance with the ascertained position of the instant signal (relative to a reference axis of the interpolation aperture, as will be described) the control unit generates 120 temporal and spatial offsets (to be further described) and addresses look-up tables for interpolation coefficients to be used by the interpolation processor. These interpolation coefficients are transmitted from the control unit 120 to the interpolation processor 132 by signal D. The control unit 120 also sends an output selection signal Op to the output processor and encoder 140 to determine the standard of the output signal P. The output processor and encoder 140 receives signal Sy from the synch pulse generator 150 for the generating of the subcarrier, line and field frequencies for the required output signal standard. The generator 150 is also linked to the control unit 120 by signal Sp. These are the conventional components of a standards converter such as the ADAC. In addition, ADAC has a further facility which is represented by the motion analysis unit 160 whereby the interpolation processing can be further modified according to the detection of motion in the input signal. The motion analysis unit is capable of a coded output which grades the degree of motion in the input signal and modifies the interpolation processing accordingly.

For the purposes of the handling of cine conversion the standards converter has been modified to incorporate a frame detector 170 which receives a luminance signal Y from the decoder 110 and detects whether there is a 3:2 sequence being processed. Upon such detection, the frame detector 170 outputs a signal Fr to the control unit 120 to indicate whether or not the input signal is standard NTSC or whether the input signal is cine NTSC (3:2 field sequence). The control unit 120 itself is modified to respond to such a signal and to operate normal video processing unless it is in receipt of a signal Fr which indicates the presence of cine NTSC (3:2 field). In this manner, the control unit can operate in a fail-safe mode whereby cine processing is only carried out when there is a positive indication of cine NTSC (3:2 field) signal. As will be further described, the control unit 120 is capable of utilising the signal Fr both to detect the signal as aforesaid and also to track the groups of three fields and two fields in five field sequences of such signal. Switching between modes during processing of a film occurs as a result of post-production techniques which have disrupted the 3:2 sequence and make it preferable to employ the normal video mode for non 3:2 sequences. An additional modification is required for the SPG generator 150 which is also modified to provide the necessary sub-carrier, line and field frequencies for the processing of an output signal at a rate of 48 fields per second at the encoder 140 (FIG. 1). In the case of an input signal of a field rate of 62.5 fields per second at the decoder 110 (FIG. 2), FIFO buffer 134 (FIG. 4) absorbs the difference in frequency: the buffer has a tolerance of up to 5% and the increase is 4%.

The decoder 110 is described in detail in applicant's patent no. GB-B-2190811, in which it is indicated that for digitizing the sampling rate for the chrominance signals U,V is 6.75 MHz and these are multiplexed as a 13.5 MHz signal as is the luminance signal Y.

Figure 4:
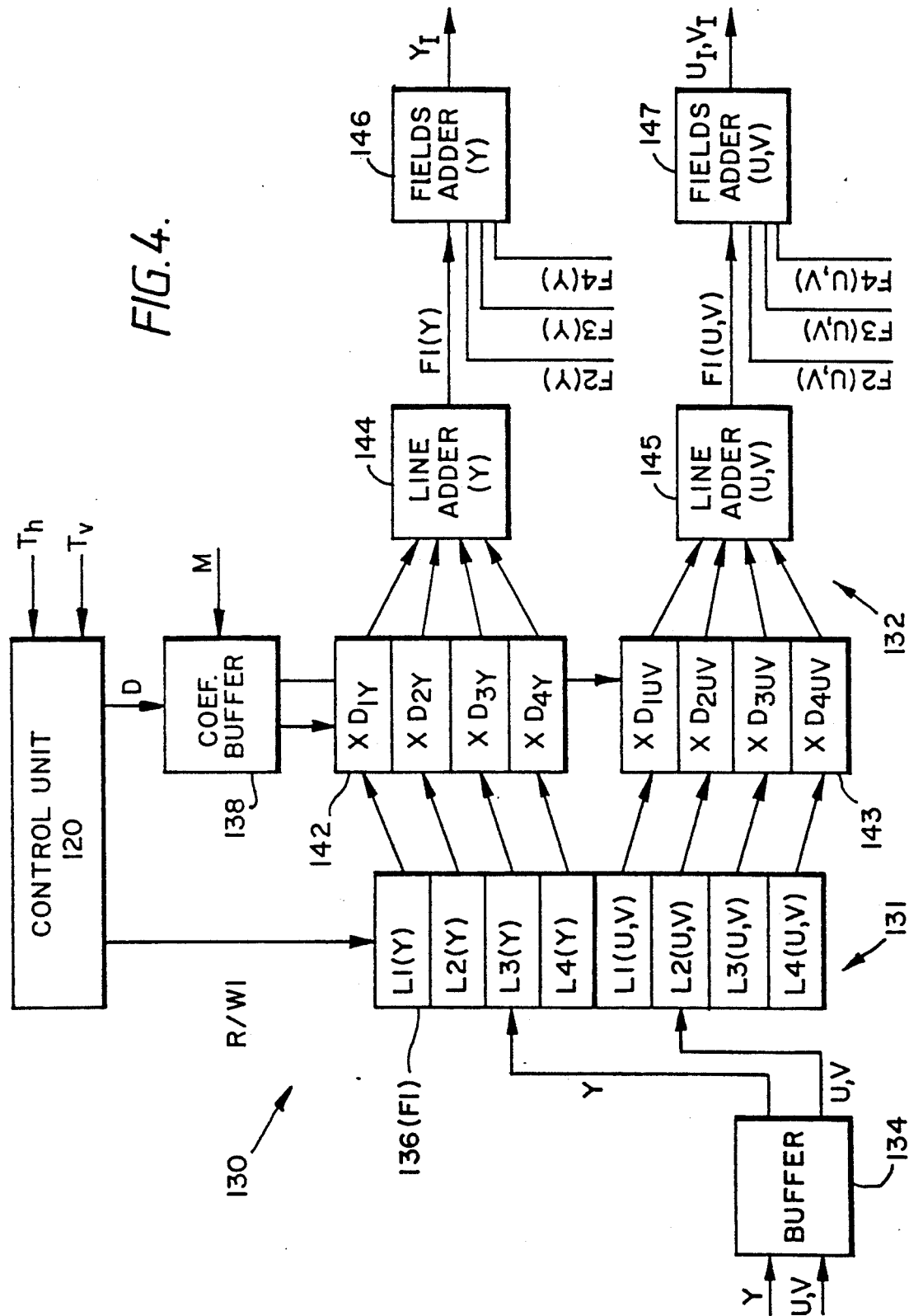
FIG. 4 illustrates conceptually a first field store and interpolation processing unit for video interpolation in the standards converter of FIG. 3.

The field store and interpolation processor unit 130 will now be further described with reference to FIG. 4 in terms of such a unit 130 suitable for normal (video) interpolation as in the ADAC standards converter. The field stores 131 and interpolation processor unit 132 are inter-related and shown in the same schematic diagram. The unit 130 comprises an input buffer 134 which receives the digitized input signals for luminance Y and chrominance U,V from the decoder 110 of FIG. 3. The buffer 134 is a synchronising buffer which operates in the FIFO mode (first in, first out). The luminance signal Y and chrominance signals U,V are then written into field stores 136 of which only the single field store 136 (F1) is shown; there are four such field stores with the identifications F1, F2, F3, F4 for four field storage. More stores may be provided; for example, the ISIS standards converter has six field stores. Four field storage is used here to explain four line, four field aperture interpolation. In the field store 136 (F1) there are two sections for four lines L1 to L4 (Y) of luminance values for pixels in the lines L1 to L4 and four lines L1 to L4 (U,V) for four lines of chrominance signals for pixels in the lines L1 to L4 all in respect of field 1 (F1). Operation of the field store 136 (F1) is controlled by read/write signals R/W1 from the control unit 120 of FIG. 3. Similar field stores for the fields F2 to F4 will receive similar read/write signals from the control unit 120. A fast coefficient buffer 138 receives interpolation coefficients output from the control unit 120 as signal D is an input thereto. Multipliers 142,143 receive the interpolation coefficients from the buffer 138 for the purpose of scaling the digital values of the luminance and chrominance signals stored in the frame store 136 (F1). BY way of example, the digital value L1(Y) is read into the multiplier 142 and multiplied by the coefficient D 1y to obtain a value which is output to the line adder 144 for luminance signals Y. Likewise the line adder 145 receives the products of chrominance signals U,V from the lines L2 to L4 from the multiplier 143. Line adder 144 outputs a luminance signal which is the sum of components over the lines L1 to L4 for field 1 as signal F1(Y) to a fields adder 146 for summing the luminance signals from 4 fields. Likewise line adder 145 outputs a signal F1(U,V) which is the sum of the products of the chrominance signals for the lines L1 to L4 for the field F1 which is sent to a fields adder 147 for chrominance signals. Fields adder 146 sums the luminance signals Y over four fields F1 to F4 and fields adder 147 sums the chrominance signals over the fields F1 to F4.

The interpolated output signals from the adders 146, 147 are output as luminance signal $Y_I$ and chrominance signals $U_I$, $V_I$ are output to an output processor and encoder 140 (as in FIG. 3). Each of the field adders 146, 147 receives inputs from each of the field stores F1 to F4, thus the adder 146 receives luminance signals F1(Y) to F4(Y) from each of the fields F1 to F4 and likewise the adder 147 receives signals F1(U,V) to F4(U,V) from each of the fields F1 to F4. Whilst only components 136 through to 147 have been shown for a single field store. 136(F1), it will be appreciated that for each of the other fields F2 to F4 there is a similar field store 136, multipliers 142, 143 and luminance and chrominance line adders 144, 145. The signal M to the coefficient buffer 138 is derived from the motion analysis unit 160 of FIG. 3 and enables the interpolation processing to be modified in accordance with the detection of motion in the signal being processed at the decoder by the unit 160. As aforesaid, the unit 160 outputs a coded signal M which indicates the degree of movement of the signal being processed. This signal is graduated so that the coefficients in the buffer 138 can be modified by the signal M according to the degree of motion: the signal M can apply a multiplication factor such as 0 through a scale to 1 to modify the effect of the interpolation coefficients according to the motion detection. This latter facility is a feature of the adaptive interpolation processing of the ADAC standards converter. Returning to FIG. 5 an explanation will be given of the conceptual basis for interpolation of cine NTSC (3:2 field) signals input at decoder 110 a input signal I. The objective of this interpolation is to interpolate from the five field sequences (divided into group of three and two fields) to the field sequences suitable for PAL television signals namely pairs of two field sequences corresponding to the aforesaid groups of three and two fields. For the purpose of explaining the conceptual basis of the interpolation the field stores and interpolation processor unit 130 (now labelled 130A) of FIG. 3 is illustrated in greater detail in FIG. 5 as comprising a field store 136(F1) to 136(F5) for each of the fields in a window comprising five fields corresponding to a five field aperture (having a three field group and a two field group). The fields are designated F1 to F5. The designations (F1) to (F5) distinguish between similar components but for different fields. Thus the circuit of FIG. 5 like the circuit of FIG. 4 has an input buffer 134 which is a synchronising buffer operating on the FIFO (first in/first out) principle between the decoder 110 of FIG. 3 and the unit 130A. It outputs luminance signals Y and chrominance signals U,V to each of the field stores 136. As in the circuit of FIG. 4 the field stores 136 receive a read/write signal R/W1 from the control unit 120 (FIG. 3) which controls the writing of the digitized luminance and chrominance values to each store for the lines L1 to L4 in the aperture both for luminance and for chrominance. The signal R/W1 also controls the reading of those values to respective ones of multipliers 148. The circuit also includes a coefficient buffer 138 receives interpolation coefficient signal D from the control unit 120 and outputs those coefficients to each of the multipliers 148. Although each multiplier 148 shows a pair of multiplier signs and the respective coefficients $D_y$ and $D_{uv}$ this is schematic; it will be appreciated that each digital value of luminance and each digital value of chrominance is multiplied by its own coefficient Dy or Duv respectively. The products of the multipliers 148 for luminance for a given field e.g. F1 are summed in a corresponding adder 144(F1). Likewise, the products of the multiplier 148(F1) for the chrominance signals are summed in an adder 145(F1). This is repeated for each field. The five field output signals for interpolated luminance Yi are output to field adders 146A and B which combine fields F1 to F3 and F4,5 respectively. Likewise, the products of the interpolated chrominance signals Ui, Vi to the field adders 147A and B which combine fields F1 to F3 and F4,5 respectively. The output signals Y(F1-3), UV (F1-3), Y(F4,5), UV(F4,5) input to the output processor and encoder 140 (see FIG. 3).

The aforegoing circuitry illustrates the concept of interpolating from a five field input to a four field output. In conceptual terms the five fields F1 to F5 appear in the five field stores 136 with the corresponding designations. Assuming that the group of three NTSC fields fell in field F1 to F3, then these fields are combined by interpolation and output as signals Y(F1-3), UV (F1-3) to produce two output fields. Likewise the other two fields would be output from field stores F4, F5, and combined by interpolation and output as signals Y (F4,5) and UV (F4,5) to produce two output fields. The interpolation is effected firstly by means of the application of the interpolation coefficients through the coefficient buffer 138, the multipliers 148, and secondly by the luminance and chrominance signal adders 144, 145 and the field adders 146A,B and 147A,B. Thus in the situation where the input signal I at the decoder 110 of FIG. 3 is a pure NTSC (3:2) signal, the control unit can monitor such signal by means of the frame detector 170 and assign the field groups e.g. F1 to F3 and F4, F5 to the respective field stores F1,F5. In terms of practical application, the control unit may operate the same interpolation using apparatus which has a field store and interpolation processor unit 130 with a four field store as shown in FIG. 3 or even a three field store. In that instance, the control unit 120 is instantly tracking the five field groups of the 3:2 field sequence through the processor unit and controlling the interpolation outputs from respective ones of the field stores 136 (F1) to 136 (F4) in dependence upon the relationship between the fields stored in a particular field store 136 and the position which it has in its 3:2 field sequence, so that the five field to (paired) four field relationship of input to output is always maintained.

Figure 5:
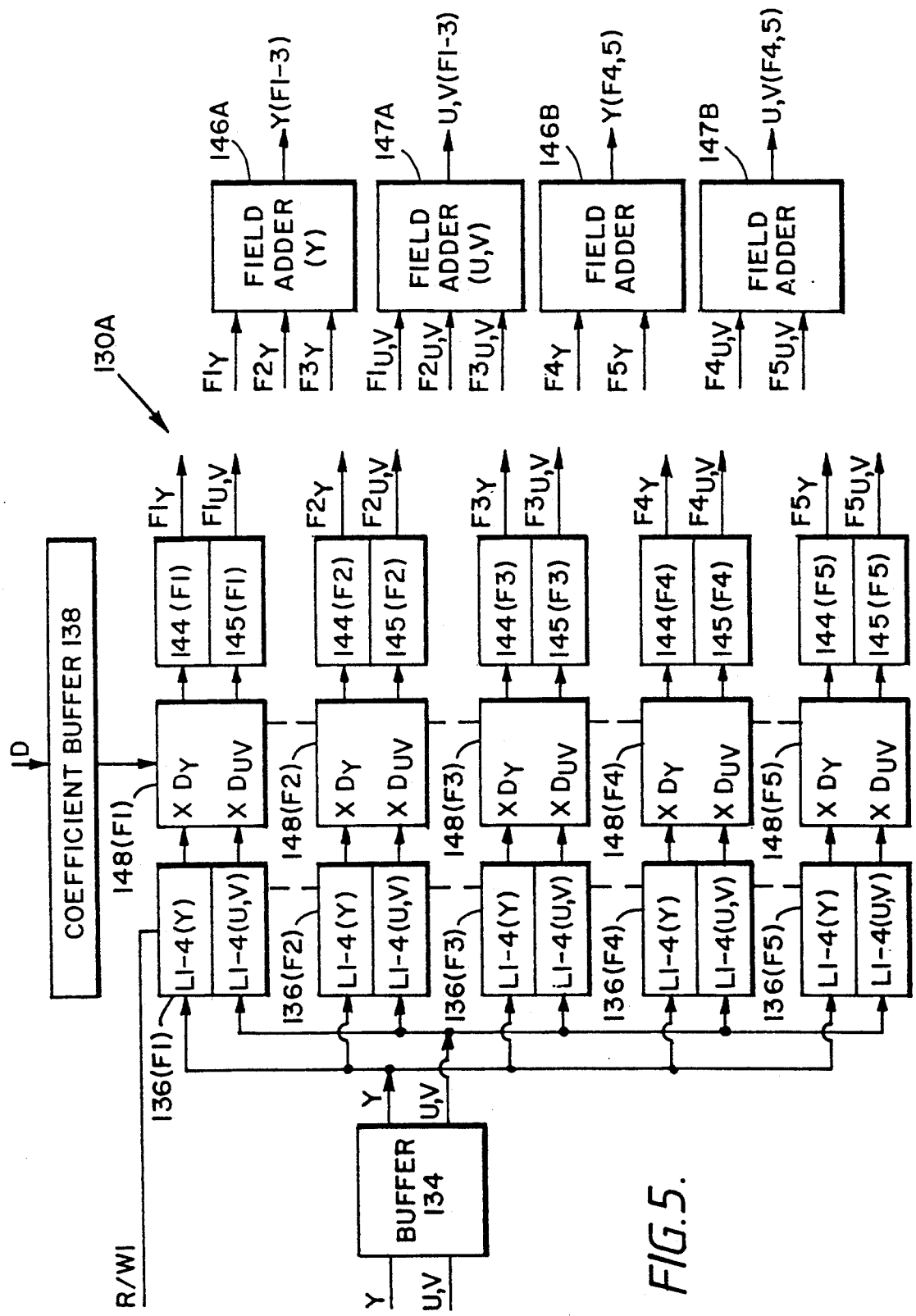
FIG. 5 illustrates conceptually a second field store and interpolation processing unit for cine interpolation in the standards converter of FIG. 3.
Figure 6:
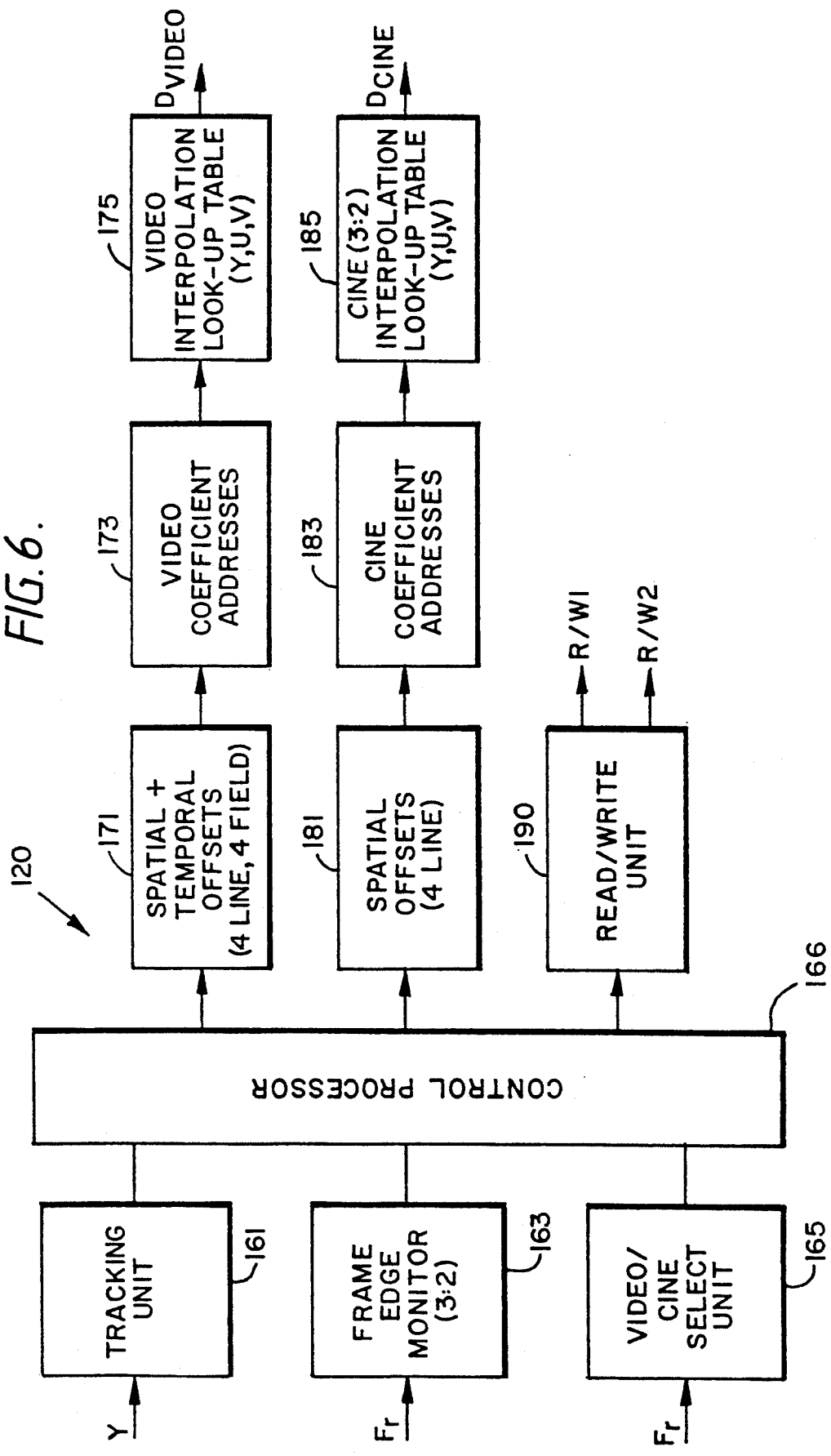
FIG. 6 illustrates conceptually the manner in which the control unit of FIG. 3 controls the operation of the field store and interpolation processing units of FIGS. 4 and 5.
Figure 7:
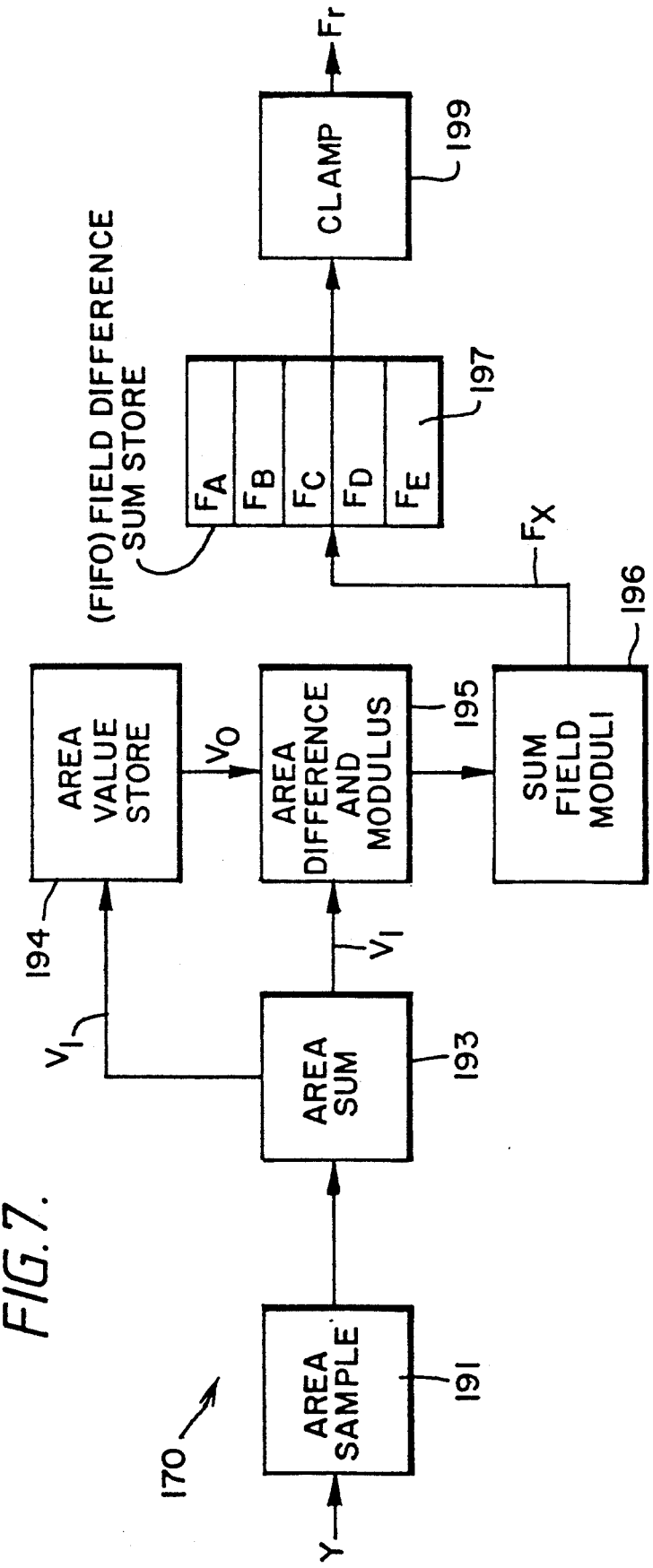
FIG. 7 shows diagramatically a frame detector for the apparatus of FIG. 3.

A general description will now be given with reference to FIG. 6 as to the manner in which the control unit 120 of FIG. 3 controls the operation of the field store and interpolation units 130, 130A of FIGS. 4 and 5. The control unit 120 is required to distinguish between the need for interpolation processing by means of a four line, four field aperture as in the case of FIG. 4 which is an example of what will be termed hereafter video interpolation and a five field aperture for cine NTSC (3:2 field) signals termed hereinafter cine interpolation. In FIG. 6 a control processor 166 controls the operation of the control unit 120 and the layout of the Figure is designed to illustrate the conceptual relationships which occur in the control unit 120 rather than component circuits. An input luminance signal Y from the decoder 110 is input to a tracking unit 161 in order that the central processor 166 can generate spatial and temporal offsets in the unit 171 for a video interpolation aperture and spatial offsets in the unit 181 for a cine interpolation aperture. The output of the unit 171 is employed in the unit 173 to generate video coefficient addresses which are then used to interrogate the video interpolation lookup table 175 to output video interpolation coefficients as signal Dvideo, which is applied to the coefficient buffer 138 in FIG. 4. Likewise, the spatial offsets calculated in unit 181 are input to unit 183 to derive the cine coefficient addresses at unit 183 which are output to unit 185. Unit 185 is a cine (3:2) interpolation lookup table from which the cine interpolation coefficients are output as signal Dcine to the coefficient buffer 138 in FIG. 5. In order to make a selection between video interpolation and cine interpolation according to the nature of the signal being processed at the decoder 110, a frame edge monitor (3:2) 163 and a video/cine select unit 165 each receive a signal Fr from the frame (3:2) detector 170 of the standards converter in FIG. 3. These units 163, 165 output the signals to the central processor 166 whereby according to the signal from unit 163 the central processor can generate a frame edge signal indicating the start of a two field or three field group in a 3:2 field sequence. This enables the central processor to output a signal to the read/write unit 190 to determine the 5 to 4 field processing and to correctly correlate the output of a two field pair from a three field input representing a single cine frame. The video/cine select unit 165 inputs a signal to the control processor 166 whereby the control processor selects cine interpolation for as long as the unit 165 indicates the presence of a cine (3:2) signal at the decoder 110. Immediately that there is a deviation from a 3:2 field sequence input (for example, caused by editing), the output of the unit 165 changes and the central processor then has advanced warning to switch the interpolation to video interpolation. If for example, in the field sequence at the decoder 110 between or following a 3:2 field sequence there was a single field detected by the frame detector 170, then the interpolation mode would change two fields in advance of the processing of that single field. In this manner, the switch from cine interpolation to video interpolation would be for a minimum sequence of five fields, two fields before the single field and two fields afterwards. The read/write unit 190 provides the read/write signals R/W1 which are input to the circuits of FIGS. 4 and 5. These signals are modified according to the form of interpolation i.e. as to whether spatial and temporal interpolation is occurring as in the case of video interpolation or as to the situation where solely spatial interpolation is occurring together with a four from five field selection as in the case of cine interpolation. The control processor 160 will be regulating additional operations of the standards converter and the aforegoing description merely seeks to illustrate its role in relation to the implementation of the two modes of interpolation by the field store and interpolation processor unit 130 of FIG. 3. It will be appreciated that the control processor 166 is programme controlled and that the operations conceptually described above are implemented by such programmes. A frame (3:2) detector 170 will now be described with reference to FIGS. 7 and 8. In FIG. 7 the circuitry of an embodiment of such a detector is illustrated in which a sample unit 191 receives the luminance signal from decoder 110 (FIG. 3) and samples pixel values over each incoming field. The samples are taken over discrete sample areas successively over the field.

Each sample area may, for example, contain eight pixel values. At sample unit 191 these areas are sampled sequentially over a given field and successively for each field of the incoming signal. The samples for a given area are output to unit 193 which sums the values of the pixels in that area. The area value, namely the total of such pixel values for a given area, is then output to units 194, 195. Unit 194, which is an area value store, is capable of holding the area values for each given area from the immediately preceeding field: its operation is controlled so that as it provides, successively for each area in a field, an area value Vo for a preceding field to an area difference and modulus unit 195 the area value store 194 is updated with the current area value $V_1$ for that area of the current field. The area difference and modulus unit 195 successively calculates for each area the difference between the area values $V_o$, $V_1$ for successive fields. In order to detect any change in the overall picture, the unit 195 outputs the modulus (or absolute value) of these differences to unit 196 whereby positive and negative differences do not cancel one another.

Figure 8:
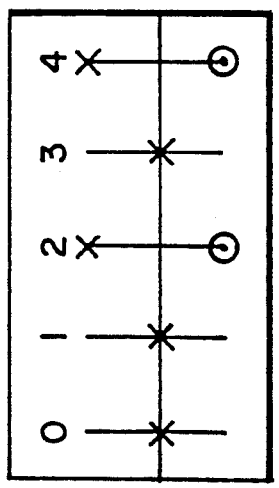
FIG. 8 shows a display for displaying information from the frame detector of FIG. 7.

The sum field moduli unit 196 sums these moduli for a whole field and outputs for each successive field a field difference sum $F_x$ to a store 197. Store 197 is capable of holding the field difference sums for five fields Fa to Fe in a current five field window. The values Fa to Fe are constantly changing on a FIFO basis (first in, first out). Each field difference sum Fx is presented to a clamp unit 199 where at any given time for a five field window, the clamp unit clamps the third lowest value of the parameters Fa to Fe to zero. This clamping of the five field aperture values may be displayed on a monitor as schematically depicted in FIG. 8. It is found that for a cine (3:2 field) sequence the values of consecutive fields, when processed in this manner, will be displayed as shown in FIG. 8. In FIG. 8, the five fields have been identified by the designations 0 to 4 and the positions of the values are indicated by a cross at the moment under review. One of the values for the fields 0, 1 and 3 is clamped to zero (bringing the other two values to near zero) and the values for the fields 2 and 4 are non-zero. It is found that the near zero values are most easily identified. The non-zero values for fields 2 and 4 may be above or below the zero value as indicated by the cross and circles respectively. The pattern shown in FIG. 8 clearly represents a cine sequence which again, is displayed on a first in/first out basis so that the actual frame boundaries depicted in FIG. 8 at the fields 2 and 4 will be constantly changing. So long as the pattern shown in FIG. 8 remains, that is to say a pattern in which there is a three field and two field sequence, then cine interpolation is required. The output signal Fr from clamp unit 199 is employed as the input to the control unit 120 in FIGS. 3 and 6. In FIG. 6, the video/cine select unit 165 merely has to recognise the pattern displayed in FIG. 8 in order to be able to generate a signal that cine interpolation is required. The frame edge monitor unit 163 is concerned to identify the non-zero values in the pattern of FIG. 8 in order to determine the start of a new cine frame and to distinguish the two field groupings and the three field groupings whereby in the cine interpolation, a field can be dropped so that the interpolation translates from five fields to four fields with a direct correlation of two fields for each cine frame.

An alternative mode of frame detection is presented by the use in the original video recording of cine film which carries a coding so that each field is identified as being part of a given cine frame. Such coding would lead to an additional input signal with the NTSC (3:2 field) signal which could be processed by the frame detector 170 of FIG. 3 so as to input the required frame signal Fr to the control unit 120. It is further possible to connect additional external equipment to the frame detector 170 so that a degree of manual control of the processing can be implemented.

The interpolation aperture for video interpolation (4 line, 4 field) of luminance signals will be described with reference to FIG. 9A. In this Figure, there is a two dimensional aperture from which the spatial and temporal offsets for the signal pixel being processed can be ascertained by virtue of its displacement from the reference axis (Ref). The aperture is viewing four fields F1 to F4 and interlaced lines L1 to L8 representing a four line window. The spatial and temporal axes are indicated. The apertures along these axes are defined by the curves S and T which are of sinusoidal character.

Figure 9A:
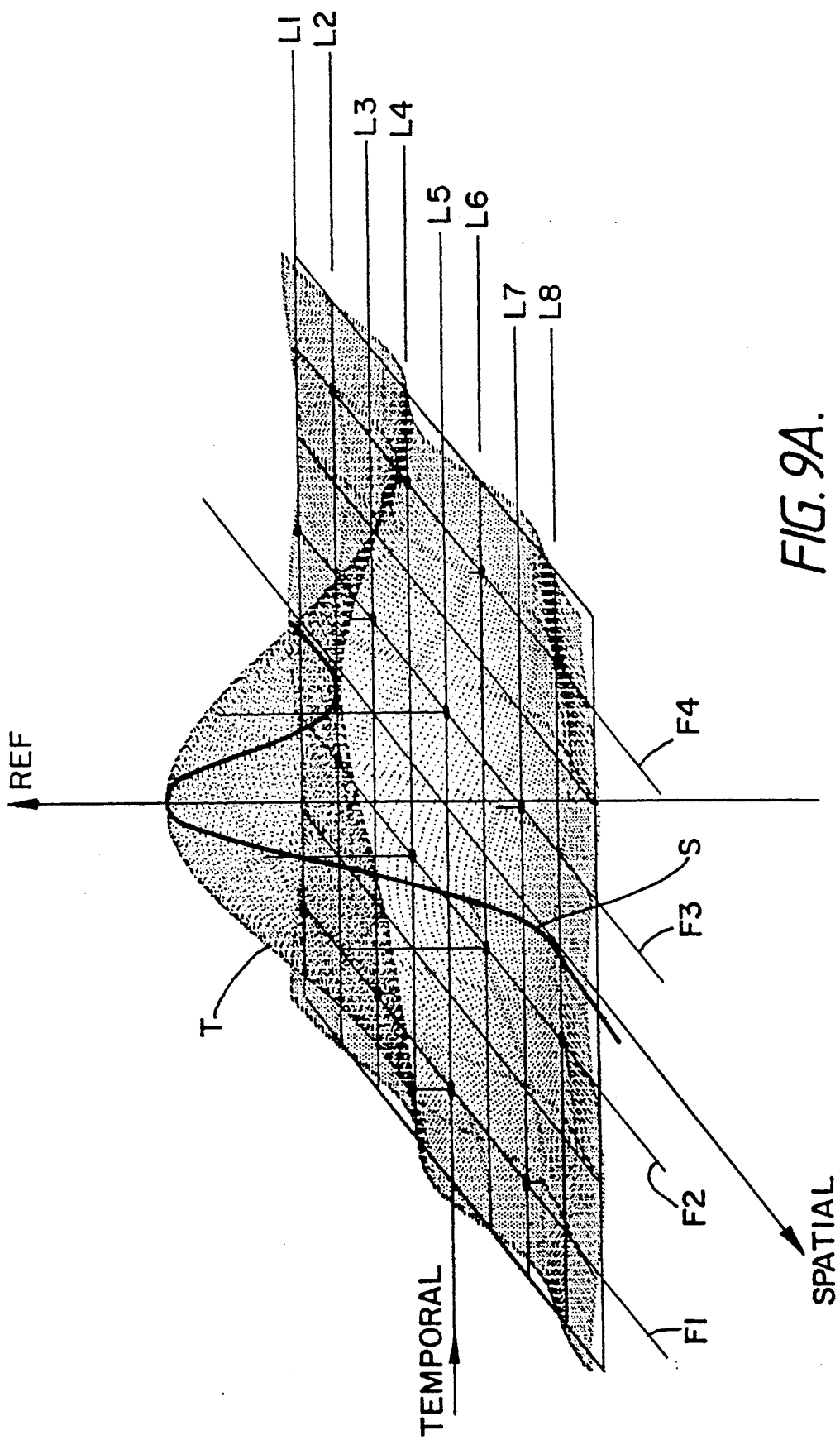
FIG. 9A and FIG. 9B illustrate interpolation apertures for spatial and temporal four field video interpolation.
Figure 9B:
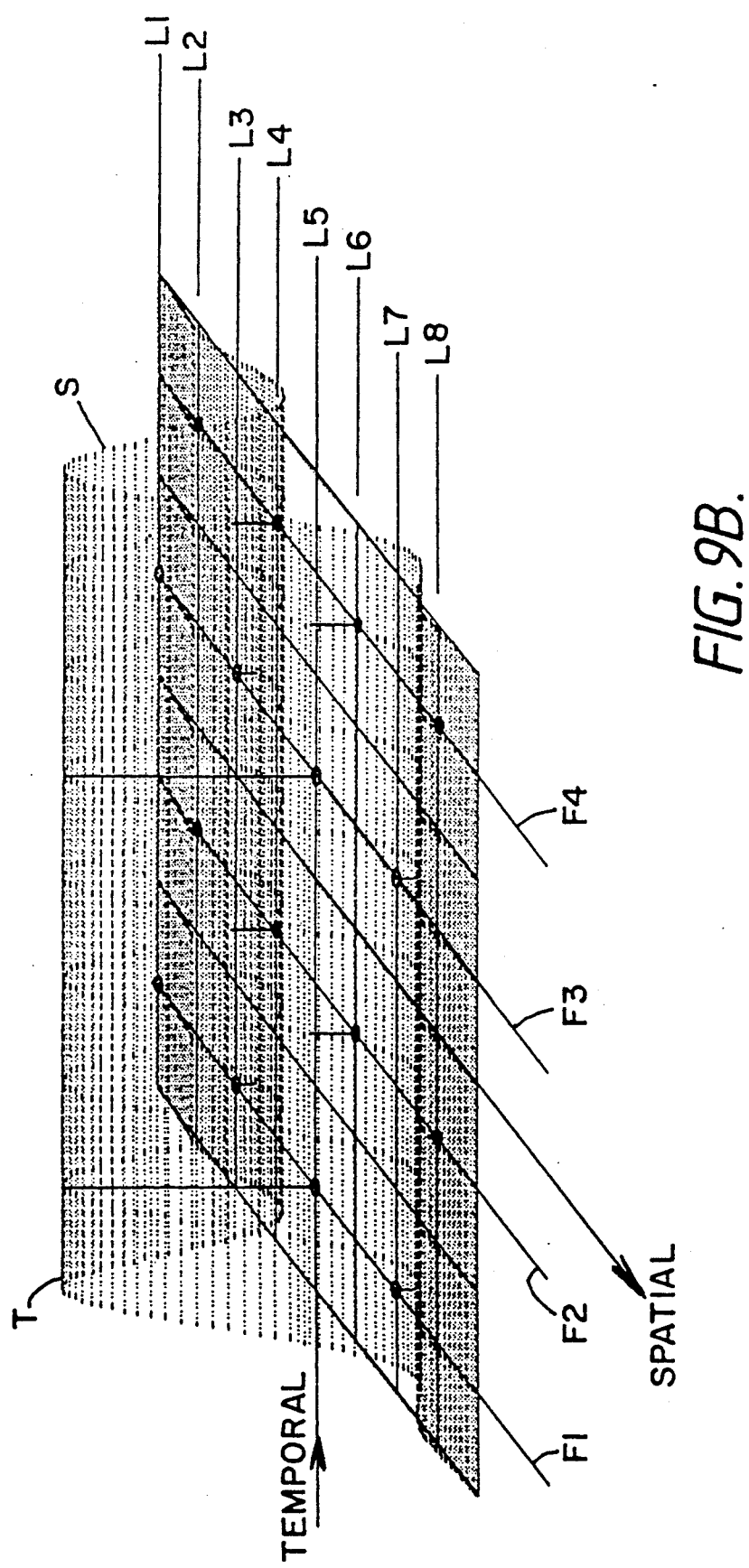

The interpolation aperture of FIG. 9A is preferred for use in video interpolation when there is moving vertical (spatial) detail and interlaced scanning. When stationary picture areas are present (as detected by a motion analysis unit 160 described with reference to FIG. 3), a second aperture function as shown in FIG. 9B may be employed in the luminance channel. In FIG. 9B the interpolation characteristic is flat (uniform) in the temporal direction, there being no need to give emphasis to any fields within the aperture since they all represent the same stationary information. In addition, it is possible to enhance the vertical frequency response thereby to reproduce much of the picture detail with a greater degree of resolution.

Turning to FIG. 10, spatial apertures S1, S2 for four field processing is indicated. The curve S1 indicates a spatial aperture for cine interpolation with high vertical resolution: the coefficients are indicated. The curve S2 illustrates the configuration of a spatial aperture for general video interpolation. The curves S1, S2 are of a sinusoidal nature. The curve S2 generally corresponds to the curve S in FIG. 9A where temporal interpolation is also occurring. The curve S1 is a sharper and more clearly defined aperture which can be used in the case where temporal interpolation is flat even if motion is present. The aperture configuration determines the interpolation coefficients which are stored in the lookup tables 175, 185 of FIG. 6. The pre-selected character of the notional interpolation curve determines these values which are pre-stored. The resolution is determined by the configuration of the aperture.

Process delays will occur when converting in the cine interpolation mode and this can be schematically illustrated by reference to FIG. 11 in which an NTSC (3:2 field) input signal having fields identified by the numbering 0, 1, etc. and frame boundaries identified by the markings Fr is input and the output is a PAL signal P with frames identified by pairs of fields labelled 2. The processing delays inevitably occur during the four from five field selection processing. These delays will be constant during uninterrupted cine-interpolation. However, when the standards converter reverts to video interpolation, the accumulation of positive or negative process delays may be re-set to a normal value at the point of changing the interpolation mode.

The foregoing discussion is intended to explain the interpolation processing which occurs with the apparatus previously described. When processing video signals (as opposed to cine originated signals), the video interpolation takes the form of spatial and temporal processing. This video interpolation is based upon a four line, four field aperture (FIG. 9): other apertures could be selected for the video interpolation. Each sampling position in the aperture is defined by an offset along each of the spatial and temporal axes. Interpolation coefficients are assigned to each sampling position and stored in the lookup tables of unit 175 (FIG. 6). Within the control unit 120, the signal processing at the decoder 110 is monitored by the means of the luminance signal Y in order to generate offsets in units 171 and 181 as described with reference to FIG. 6. These offsets represent the current sampling position within the interpolation aperture in terms of the spatial and temporal offset. The required interpolation coefficients for a given sampling position are read out from the lookup tables in unit 175 by addressing the table from unit 173 with the video coefficient addresses derived from the currently generated values of the spatial and temporal offsets. These interpolation coefficients are then read out to the interpolation processing unit 132 of FIGS. 3 and 4. When motion analysis is incorporated in video interpolation by means of the unit 160 in FIG. 3, this allows for a adaptive interpolation processing whereby the implementation of the interpolation coefficients is subject to further control in accordance with the output of the unit 160.

In the case of processing cinematic sequences which correspond to pairs of cine frames in a 3:2 field sequence, cine interpolation is required in which from each 3:2 input sequence the output is in the form of two pairs of output fields. As aforesaid, with reference to FIG. 6, the control unit 120 discriminates between input signals which represent cine sequences and input signals which represent video sequences. The unit 120 also determines the frame boundaries of the 3:2 sequence of the input signal. The control unit switches from a cine interpolation mode to a video interpolation mode in accordance with the signal received from the frame detector 170 (FIG. 3). The default mode is the video interpolation mode so that cine interpolation mode is reserved to the situation where there is absolute certainty that cine signals in the form of NTSC (3:2 field) sequences are input. This creates a fail-safe situation whereby video interpolation is carried out unless the correct cine input is received. Motion analysis at the unit 160 is only employed in the video interpolation mode where temporal interpolation is occurring. The exact correlation between successive frames of an originating cine film and the field pairs of an output signal can be ascertained from FIG. 11. The frames of the cine film are clearly identified in the NTSC field sequence and the corresponding frames are indicated in the PAL signal whereby each cine frame is represented by a field pair in the PAL output signal. As mentioned in relation to FIGS. 1 and 2, the conversion processing in the case of cine film does result in a 4% reduction of viewing time when the programme is translated to PAL transmitted at a field rate of 50 fields per second as opposed to the original cine film projection rate of 24 frames per second i.e. with a direct correlation, a television field rate of 48 frames per second. As will be apparent, there is a process delay between the signal passing through the decoder 110 and processing of that signal in the interpolation processing unit 132 which enables the control unit 120 a sufficient processing interval to receive advanced warning of the necessity of a change of interpolation mode and also to generate the interpolation coefficients which will be required in the unit 132. The delay may be varied by the control unit 120 itself under suitable programme control.

We claim:

1. A method of conversion of an input television signal of a first television standard, said input television signal containing at least in part original field sequences corresponding to individual cine frames contained in original cine film having a slower frame rate than the frame rate of said input television signal, said method comprising the steps of:
   (a) converting said input television signal to an intermediate television signal of a second television standard in which intermediate signal there is a direct correlation between the field groups thereof and said individual cine frames, and
   (b) modifying the field rate of said intermediate television signal to the field rate of a desired television signal of a third television standard and generating said desired signal as an output signal.

2. The method of claim 1, wherein said input television signal is an NTSC television signal originally produced at least in part from cine film having a 24 frame per second advance rate by a 3:2 pull down technique whereby pairs of succeeding said individual cine frames are repeated as sets of 3 and 2 signal fields respectively in said NTSC signal, and wherein said output signal is a PAL television signal having a pair of successive television signal fields for each one of said individual cine frames.

3. The method of claim 2, wherein in step (a) said NTSC television signal is converted to an intermediate standard with a characteristic of 625 lines and 48 fields per second whereby each frame represented by a field group in the 3:2 field sequence in said NTSC television signal is represented by two fields in said intermediate signal and whereby a one to one correlation exists between said frames of said cine film and said pairs of fields in the converted television signal.

4. The method of claim 3, wherein step (b) comprises modifying the transmission rate of said intermediate signal to produce an accelerated transmission rate of 50 fields per second, thereby to produce a standard PAL output signal.

5. The method of claim 4, wherein said accelerating comprises recording said intermediate signal at the field rate of 48 fields per second using a modified recorder and then playing said recording on a standard PAL player to produce an output PAL television signal with a field rate of 50 fields per second.

6. The method of claim 4, wherein said accelerating comprises inputting said signal at a field rate of 48 fields per second to a buffer store from which a standard PAL television signal is the output at the signal rate of 50 fields per second.

7. A method of conversion of an input television signal of a given television standard, said input television signal containing at least in part original field sequences corresponding to individual cine frames contained in original cine film source material having a slower frame rate than the frame rate of said input television signal, said method comprising the steps of:
   (a) modifying the field rate of said input television signal to obtain an intermediate standard television signal containing said original field sequences corresponding to cine frames, and
   (b) converting said intermediate standard television signal into an output television signal of a desired television standard, said output television signal having a direct correlation between its field groups and said individual cine frames.

8. The method of claim 7, wherein said input television signal is an NTSC television signal originally produced at least in part from cine film having a 24 frame per second advance rate by a 3:2 pull down technique whereby pairs of succeeding said individual cine frames are repeated as sets of 3 and 2 signal fields respectively in said NTSC signal, and wherein said output signal is a PAL television signal having a pair of successive television signal fields for each one of said individual cine frames.

9. The method of claim 8, wherein in step (a) said NTSC signal has a field rate of 60 fields per second and is so converted to produce said intermediate signal and said intermediate signal has a modified field rate of 62.5 fields per second.

10. The method of claim 9, wherein said step (a) comprises playing a recording of said NTSC signal on a modified video player to obtain said intermediate signal and said intermediate signal has an accelerated field rate of 62.5 fields per second.

11. The method of claim 9, wherein said step (b) comprises converting said intermediate signal from 525 lines and 62.5 fields per second to a PAL signal of 625 lines and 50 fields per second such that from each 3:2 field sequence in said intermediate signal said PAL output signal has a pair of fields representing each said individual frame of said original cine film, each said individual frame being derived from respective ones of said three and two field groups.

12. A method of input television signal conversion from one television standard to another wherein said input signal incorporates fields derived at least in part from individual frames of cine film run at 24 frames per second, said method comprising the steps of:
  (a) distinguishing in said input signal between signals from said cine film and any remaining signals not so derived,
  (b) converting said so distinguished input signals into an intermediate signal wherein there is material in accordance with a cine interpolation technique characterized by an output signal maintaining a direct correlation between said individual frames and groups of television signal fields, and
  (c) converting said remaining signals in accordance with a video interpolation technique characterized by a spatial and temporal aperture.

13. A frame detector for use with a television standards converter in the conversion of an input television signal comprising at least in part material derived from cine film originated material, said detector comprising means for sampling pixel values on an area by area basis for discrete areas over a field of said input television signal, means for summing those pixel values for each given discrete area, means for deriving on an area by area basis the difference between the area value for said field under review and the preceding field and for providing the modulus of said difference, means for summing said moduli of said area difference values over said field under the review and for obtaining a field difference sum, means for comparing the field difference sums over a group of fields so as to identify frame boundaries in a sequence of said field difference sums, whereby the identification of regular sequences of frame boundaries in an output signal thereof is indicative of said television signals.

14. The method of claim 10, wherein said step (b) comprises converting said intermediate standard from 525 lines ad 62.5 fields per second to a PAL signal of 625 lines and 50 fields per second such that from each 3:2 field sequence in said intermediate signal said PAL output signal has a pair of fields representing each said individual frame of said original cine film, each said individual frame being derived from respective ones of said three and two field groups.

15. A television standard signal converter for converting a first television signal in a standard form into a second television signal in another standard form, said first signal containing field sequences corresponding to individual frames contained in a cine film which is advanced at a slower frame rate than the frame rate of said first signal, said converter comprising:
  (a) interpolation means for maintaining a direct correlation between predetermined groups of signal fields in said second signal and said individual frames in said cine film; and
  (b) means for modifying the field rate of said second signal.

16. The signal converter of claim 15 wherein said first signal is an NTSC television signal that is produced by a 3:2 pull down technique wherein said individual frames in said cine film are repeated as sets of 3 and 2 signal fields respectively and wherein said second signal is a PAL television signal having a pair of successive television signal fields for each one of said individual frames in said cine film.

17. The signal converter of claim 15 wherein said signal further contains other television signals which correspond to other material to be interpolated according to conventional television standard techniques for television signals, and wherein said signal converter further includes means for distinguishing in said first signal said field sequences for conversion by said interpolation means.

* * * * *